Patented Nov. 5, 1940

2,220,759

UNITED STATES PATENT OFFICE 2,220,759

COMPOUNDING MATERIAL FOR RUBBER

Norbert S. Garbisch, Butler, Pa.

No Drawing. Application April 19, 1938,
Serial No. 202,908

3 Claims. (Cl. 260—766)

The present invention relates to methods of and compositions for compounding rubber and it has particular relation to the provision of an inert finely divided material adapted to be incorporated into rubber mixes as an extender or filler therefor.

One object of the invention is to provide an inexpensive extender or filler material, suitable for use in rubber compound, which is chemically inert with respect, not only to the various ingredients of a rubber batch, but also with respect to chemical agencies with which the rubber compound may contact during service, and which when employed, results in a stock having relatively high mechanical strength and elasticity.

A second object of the invention is to provide a filler or extender for rubber compound which is easily incorporated into the compound to provide an exceptionally plastic mix.

These and other objects will be apparent from consideration of the following specification and the appended claims.

In the manufacture of rubber articles, rubber either in the form of raw rubber, or in the form of reclaimed rubber, is mixed with various chemical materials, including sulfur accelerators of vulcanization and vegetable oils and acids, and other compounding ingredients. In most instances, finely divided pigmentary materials known as fillers or extenders are likewise included. Sulfur of course constitutes the vulcanizing agent. Accelerators of vulcanization may be organic materials such as mercaptobenzothiazol, diphenyl guanidine and many other materials. The accelerators usually are activated by bases such as zinc oxide, litharge, lime and the like. Some of the latter also constitute fillers or extenders for the rubber. The oils and acids are employed to improve dispersion, plasticity and milling properties of the batch. Some of them, such as stearic acid, also promote vulcanization. Antioxidants or age retarders such as phenyl beta naphthylamine or other secondary aromatic amines are also often included.

Finely divided carbon black constitutes one of the best extenders, but, of course, it is relatively expensive to obtain, and for that reason its use in many of the cheaper forms of rubber compounds is impracticable. Cheaper forms of extenders include lithopone and finely divided calcium carbonate or whiting.

The latter forms of extenders are not, in all cases, satisfactory, because they are relatively alkaline in nature and in some instances tend to react with the compounding chemicals to disturb vulcanizing and/or aging properties. They are also relatively reactive with respect to acids and such like materials with which rubber may contact during service. Furthermore, they are relatively porous in character and tend to absorb excessive amounts of the dispersing agents or softeners such as pine oil or turpentine which frequently are incorporated into rubber materials in order ot increase the workability thereof.

In many instances, the electrical resistance of rubber compounds containing whiting and similar fillers or extenders is relatively low. This is particularly true in cases where the compounds are subjected to the action of moisture.

The present invention is based upon the discovery that intimate mixtures of very finely divided silica and glass obtained as waste products in grinding of ordinary plate glass with sand to produce uniform surfaces, may be so treated as to obtain products of outstanding merit for use in suitable amounts (e. g. 5–50%) in the preparation of many rubber compounds. The term rubber includes both new and reclaimed rubber and artificial rubbers such as "Duprene" and chloroprene.

The grinding operation in the finishing of plate glass is usually initially conducted with coarse sand in suspension in water as an abrasive. This sand is pressed against and impelled along the surface of the glass plate by means of iron blocks or runners. During the course of the grinding operation, the sand is gradually broken down into finer and finer particles and becomes contaminated with very fine chips of glass from the surface of the plate, particles of iron abraded from the surface of the cast iron runners, plaster from the polishing tables and other substances. From time to time this mixture of glass, silica and iron is subjected to a classification operation in which the coarser particles of silica are separated from the finer material and returned to the grinding operation. The finer material comprising broken up sand, finely divided glass and iron, as well as other materials, is either discarded or advanced to the later stages of the grinding operation in order to make the finer cuts. Ultimately, all of the sand becomes broken up to such a fine state of subdivision that it can no longer be employed in the grinding operation and heretofore has been discarded. At the time of discarding, the material is a water suspension of particles of such fine state of subdivision that practically all will pass through a screen about 325 mesh. The main ingredients are approximately as follows: Silica, 75 or 80%, glass, 12 to 20%, finely divided iron about 1 to 3% and minor proportions of other ingredients. Heretofore, this material has been regarded as being of no value and has been discarded by running it into streams, or by running it out upon dumps. In this way, many millions of tons of very finely divided siliceous material have been disposed of and have constituted serious nuisances about glass manufacturing plants.

In accordance with the provisions of the present inventions, this intimate mixture of very finely divided silica, glass and other materials, in partially a hydrated condition, is subjected to the action of a mineral acid, preferably in diluted state. Phosphoric acid, hydrochloric acid or sulfuric acid are preferred. A concentration of about 5% to 10% of the acid is satisfactory. However, higher or lower concentration of the acid may be employed. Higher concentrations will increase the cost of the treatment, and usually is not preferred.

The sludge or paste of waste sand subjected to the treatment may be fresh from the polishing and grinding operation. Likewise, partially dehydrated material from the dumps or storage piles may be employed. Treatment of the waste material with acid may be effected at any reasonable temperature up to the boiling point of water. However, in most instances, it is more economical to effect the treatment at approximately normal or atmospheric temperature. The material, prior to treatment with acid, may be passed through a magnetic separator to remove metallic iron.

As a result of the acid treatment, most of the metallic iron and iron compound contained in the waste materials are dissolved. Likewise, a considerable amount of alkali hydrolyzed from the glass is taken into solution. After the acid treatment has progressed sufficiently far, the mixture of finely divided material in water is subjected to washing in a filter press or in suitable settling apparatus in order to remove the soluble materials. Ultimately, there is obtained a substantially neutral mixture of finely divided glass and sand or silica which may be filtered and dried by conventional apparatus.

The surfaces of the particles of glass are coated with films of silica. It is also probable that the particles of silica are partially eroded and hydrated to provide surfaces that are especially susceptible of bonding with rubber, when milled therewith. The coatings of silica upon the particles of glass, of course, reduce sensitivity to chemical reaction.

The proportion of glass in the mix can be increased by addition of finely divided or pulverized glass. It can also be decreased by subjecting the material to classification in suitable separators in which a preferential separation of minute particles of glass is effected. It is also possible by treating the mixture of glass and silica with a 5 or 10% solution of sodium hydroxide to dissolve out most of the glass to leave a mass of practically pure, very finely divided silica.

The sodium silicate produced in the latter process may be washed out and concentrated for use in other fields.

The material, along with sulfur, accelerators of vulcanization, softeners, anti-oxidants and other compounding ingredients may be incorporated into substantially any formula for hard or soft rubber, in which an extender or filler would be employed. However, they are of particular value in rubber formulae designed for resistance to the action of acid or other chemicals and in hard rubbers. The following constitutes an example of one type of material in which the new fillers or extenders may be employed with satisfaction:

*Example*

| | Parts |
|---|---|
| Reclaimed rubber | 55 |
| Softener | 5 |
| Sulfur | 6 |
| Lime | 7 |
| Treated waste from polishing operation | 27 |

A further example of a compound formula is as follows:

*Example*

| | Parts |
|---|---|
| Litharge | 1.5 |
| Zinc oxide | 4 |
| Sulfur | 24 |
| Lime | 10 |
| Cottonseed oil | 6 |
| Filler (recovered sand) | 23 |
| Montan wax | 4 |
| Guayule | 15 |
| Smoked sheets | 25 |
| Stearic acid | 2 |
| Reclaimed rubber | 5 |
| Carbon black | 2 |
| | 121.5 |

Time of cure 90 to 120 minutes at 300° F. A further example is as follows:

*Example*

| | Parts |
|---|---|
| Pale crepe rubber | 62.97 |
| Diphenyl guanidine | 0.99 |
| Sulfur | 2.46 |
| MgO | 1.50 |
| Zinc oxide | 5.51 |
| Sand filler | 25.60 |
| Stearic acid | 0.97 |

Samples prepared in accordance with this formula were vulcanized at 287° F. for periods varying from 15 to 90 minutes, and were then found to be well cured. Optimum cure seemed to be at about 60 minutes. Accelerators of vulcanization such as diphenyl guanidine or mercaptobenzothiazol and the like in amounts of 1 or 2% may be incorporated in the mixture if desired. Rubber compounds containing the new fillers or extenders are substantially less stiff than materials containing whiting and similar extenders or fillers, and therefore may be homogenized in less time and with less expenditure for power than conventional materials. Reduction of amount of softener required in order to render the material workable is also permitted. It, of course, follows that greater amounts of filler may be introduced into a rubber compound without excessively stiffening it.

Rubber compounds containing the waste siliceous bodies from grinding and polishing operations after vulcanization, are characterized by very high resistance to penetration and absorption of acids. This greatly enhances the value of the material for use for such purposes as the manufacture of boxes for storage batteries. In a test it was found that a rubber composition suitable for use in the manufacture of battery boxes after exposure to the action of sulfuric acid for a period of 30 days had absorbed approximately 1% of acid. A corresponding composition, in which the finely divided silica, as constituting the subject matter of the present invention, was replaced by ordinary clay of the type usually employed in the manufacture of such materials, had absorbed approximately 8%. It will be apparent that the siliceous bodies are of value as fillers or extenders in practically any rubber composition where chemical resistance is desired. For example, the fillers may be used in rubber compounds designed for the lining of tanks of wood, iron or other chemical apparatus.

The compounds possess valuable electrical characteristics such as a good power factor, high dielectric, high resistance to electrical current, etc. Therefore, they are valuable as electrical insulating media, for covering conductors, and as mounting panels or as housings for electrical instruments.

The finely divided silica and glass may be incorporated directly into rubber batches or may be preliminarily admixed with oils, pine tar, fats, oleic acid, stearic acid or other agent designed to improve dispersability of the material or to improve the plasticity or vulcanizing characteristics of the rubber mix.

The finely divided material may also be incorporated either prior to or during the compounding operation, with other compounding ingredients including carbon black, clay, zinc oxide, whiting, etc.

The new fillers are also of value for use in compounds used in the manufacture of airbags employed in the vulcanization of automobile tires and other apparatus. It is probable that the siliceous particle by reason of their resistance to chemical action constitute barriers against the migration of sulfur from the material being vulcanized to the walls of the airbags. Accordingly, over-vulcanization which ultimately results in excessive hardening and cracking and breaking of the airbags, is retarded. Rubber may be replaced by artificial rubbers such as "chloroprene" or "duprene," either in part or in entirety.

The specific forms of the invention herein disclosed are to be considered merely as exemplary. It will be apparent to those skilled in the art that numerous modifications may be made therein without departure from the spirit of the invention or the scope of the following claims.

What I claim is:

1. A process of preparing rubber compounds which comprises admixing rubber with compounding ingredients including waste sand from the grinding and polishing of glass, said waste sand comprising a mixture of finely divided silica and glass and having been treated with a mineral acid prior to compounding with the rubber.

2. A process of preparing hard rubber which comprises admixing rubber with compounding ingredients comprising sulphur and a filler consisting of an intimate mixture of finely divided silica and glass obtained by grinding glass with sand and then treating the resultant finely divided mixture with a mineral acid and washing away the free acid and finally vulcanizing the rubber.

3. An acid and moisture-resistant product comprising a vulcanized hard rubber and as a filler therefor a mixture of very finely divided silica and glass, resulting from the grinding of plate glass with sand as the medium of abrasion, the mixture having been treated with acid and being of a particle size to pass a screen of 325 mesh.

NORBERT S. GARBISCH.